(12) United States Patent
Huang et al.

(10) Patent No.: US 12,387,506 B2
(45) Date of Patent: Aug. 12, 2025

(54) METHOD FOR RECOGNIZING LICENSE PLATE CHARACTERS, ELECTRONIC DEVICE AND STORAGE MEDIUM

(71) Applicants: Hefei BOE Display Technology Co., Ltd., Anhui (CN); BOE Technology Group Co., Ltd., Beijing (CN)

(72) Inventors: Yanting Huang, Beijing (CN); Kai Wang, Beijing (CN); Hongxiang Xu, Beijing (CN); Wentao Lu, Beijing (CN)

(73) Assignees: Hefei BOE Display Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 336 days.

(21) Appl. No.: 17/914,993

(22) PCT Filed: Feb. 2, 2021

(86) PCT No.: PCT/CN2021/074915
§ 371 (c)(1),
(2) Date: Sep. 27, 2022

(87) PCT Pub. No.: WO2021/196873
PCT Pub. Date: Oct. 7, 2021

(65) Prior Publication Data
US 2023/0154210 A1 May 18, 2023

(30) Foreign Application Priority Data
Mar. 30, 2020 (CN) .......................... 202010234926.2

(51) Int. Cl.
G06V 10/82 (2022.01)
G06N 3/0464 (2023.01)
(Continued)

(52) U.S. Cl.
CPC ......... *G06V 20/625* (2022.01); *G06N 3/0464* (2023.01); *G06V 10/242* (2022.01);
(Continued)

(58) Field of Classification Search
CPC .. G06V 20/625; G06V 10/242; G06V 10/764; G06V 10/7715; G06V 10/82;
(Continued)

(56) References Cited

U.S. PATENT DOCUMENTS

2017/0286809 A1* 10/2017 Pankanti .................. G06N 3/08
2020/0019799 A1* 1/2020 Shen ....................... G06V 10/25
(Continued)

FOREIGN PATENT DOCUMENTS

CN 109815956 A 5/2019
CN 109934864 A 6/2019
(Continued)

OTHER PUBLICATIONS

PCT/CN2021/074915 international search report.
(Continued)

*Primary Examiner* — Stephen P Coleman
(74) *Attorney, Agent, or Firm* — IPro, PLLC

(57) ABSTRACT

A license plate character recognition method and apparatus, an electronic device, and a storage medium. The method comprises: after obtaining a vehicle image captured by an image capturing device, positioning a vehicle plate area in the vehicle image to obtain a license plate image, and performing feature extraction on the license plate image by means of a convolutional neural network comprising a residual network structure. Gradient vanishing is effectively avoided and feature loss in a convolutional process of the convolutional neural network is reduced, so that a bidirectional recurrent neural network model can accurately recognize license plate characters in the license plate image on
(Continued)

the basis of feature information of the license plate image. Therefore, character segmentation for a license plate is not needed, license plate characters on the license plate can be obtained by directly recognizing the whole license plate, segmentation and separate recognition for the license plate characters are avoided, and the recognition speed and the recognition accuracy are improved.

20 Claims, 7 Drawing Sheets

(51) Int. Cl.
*G06V 10/24* (2022.01)
*G06V 10/764* (2022.01)
*G06V 10/77* (2022.01)
*G06V 20/62* (2022.01)

(52) U.S. Cl.
CPC ........ *G06V 10/764* (2022.01); *G06V 10/7715* (2022.01); *G06V 10/82* (2022.01)

(58) Field of Classification Search
CPC ...... G06V 10/454; G06V 20/63; G06V 30/10; G06N 3/0464; G06N 3/084; G06N 3/044; G06N 3/045

USPC ........................................................ 382/103
See application file for complete search history.

(56) References Cited

U.S. PATENT DOCUMENTS

2020/0090004 A1\* 3/2020 Takeyasu ............. G06V 20/582
2020/0193232 A1\* 6/2020 Wang ..................... G06N 3/045
2020/0250398 A1\* 8/2020 Courtiol ............... G06V 20/698

FOREIGN PATENT DOCUMENTS

| CN | 110321755 A | 10/2019 |
| CN | 110363049 A | 10/2019 |
| CN | 110414451 A | 11/2019 |
| CN | 111444917 A | 7/2020 |

OTHER PUBLICATIONS

CN202010234926.2 first office action.
CN202010234926.2 second office action.
CN202010234926.2 Decision of rejection.

\* cited by examiner

METHOD FOR RECOGNIZING LICENSE PLATE CHARACTERS, ELECTRONIC DEVICE AND STORAGE MEDIUM

CROSS-REFERENCE TO RELATED APPLICATION

The present disclosure is a U.S. national stage of international application No. PCT/CN2021/074915, filed on Feb. 2, 2021, which claims priority to Chinese Patent Application No. 202010234926.2, filed on Mar. 20, 2020, and entitled "LICENSE PLATE CHARACTER RECOGNITION METHOD AND APPARATUS, ELECTRONIC DEVICE, AND STORAGE MEDIUM," the disclosures of which are incorporated herein by reference in their entireties.

TECHNICAL FIELD

The present disclosure relates to the field of image technologies, and in particular, to a method and an apparatus for recognizing license plate characters, an electronic device and a storage medium.

BACKGROUND

With the increasing of the number of automobiles in China, the research and application of intelligent license plate recognition and management systems becomes more and more important. At present, the application of the intelligent license plate recognition systems in areas such as highway toll stations, residential parking lots and the like becomes more and more extensive.

SUMMARY

The present disclosure provides a method and an apparatus for recognizing license plate characters, an electronic device and a storage medium. The technical solutions are as follows.

According to some embodiments of the present disclosure, a method for recognizing license plate characters is provided. The method includes: acquiring a vehicle image captured by an image capture device; acquiring a license plate image by locating a license plate region of the vehicle image; acquiring feature information of the license plate image by performing feature extraction on the license plate image using a convolutional neural network, wherein the convolutional neural network includes a residual network structure; and acquiring license plate characters corresponding to the license plate image by analyzing the feature information using a bidirectional recurrent neural network model.

According to some embodiments of the present disclosure, an electronic device is provided, including: one or more processors and a memory configured to store one or more computer instructions executable by the one or more processors, wherein the one or more processors, when loading and executing the one or more instructions, are caused to perform: acquiring a vehicle image captured by an image capture device; acquiring a license plate image by locating a license plate region of the vehicle image; acquiring feature information of the license plate image by performing feature extraction on the license plate image using a convolutional neural network, wherein the convolutional neural network comprises a residual network structure; and acquiring license plate characters corresponding to the license plate image by analyzing the feature information using a bidirectional recurrent neural network model.

According to some embodiments of the present disclosure, a non-transitory computer-readable storage medium storing one or more computer instructions thereon is provided, wherein the one or more computer instructions, when loaded and executed by a computer, cause the computer to perform: acquiring a vehicle image captured by an image capture device; acquiring a license plate image by locating a license plate region of the vehicle image; acquiring feature information of the license plate image by performing feature extraction on the license plate image using a convolutional neural network, wherein the convolutional neural network comprises a residual network structure; and acquiring license plate characters corresponding to the license plate image by analyzing the feature information using a bidirectional recurrent neural network model.

Other effects of the above optional manners will be described below in combination with specific embodiments.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION

The following describes the embodiments of the present disclosure in detail, examples of the embodiments are illustrated in the accompanying drawings, wherein the same or similar reference signs throughout refer to the same or similar elements or elements having the same or similar functions. The embodiments described below with reference to the accompanying drawings are exemplary, and are intended to explain the present disclosure, but should not be construed as a limitation to the present disclosure.

The method and apparatus for recognizing license plate characters, and the electronic device according to the embodiments of the present disclosure will be described below with reference to the accompanying drawings.

Conventionally, the mode of recognizing a license plate in the relevant intelligent license plate recognition system is generally as follows: firstly, character segmentation is performed on a located license plate, then character features are extracted from a single character, and finally license plate character recognition is performed on the license plate. However, since the above mode of recognizing the license plate is based on character segmentation, it is difficult to guarantee accuracy of the character segmentation, resulting in lower accuracy in license plate recognition.

Figure 1:
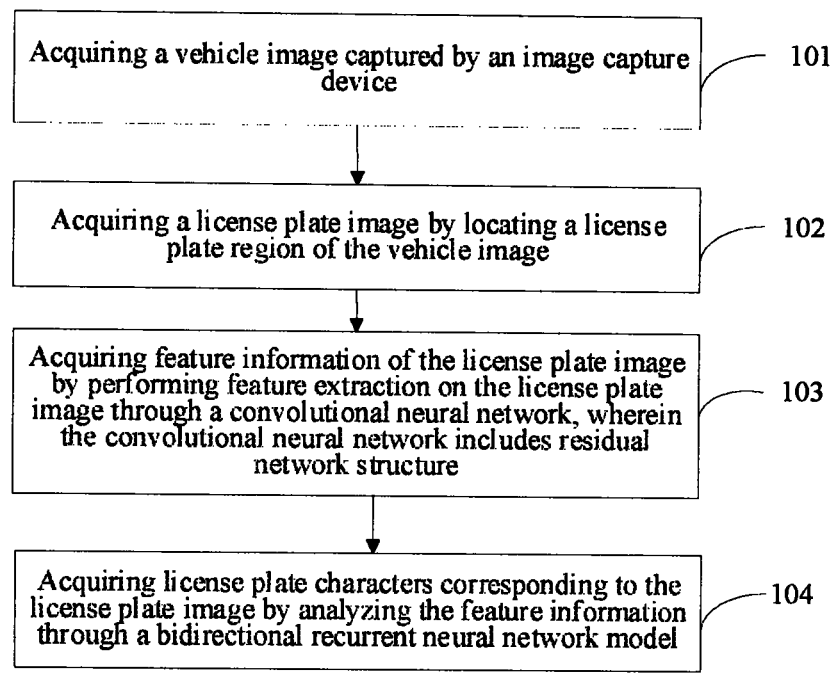
FIG. 1 is a schematic flowchart of a method for recognizing license plate characters according to some embodiments of the present disclosure.

FIG. 1 is a schematic flowchart of the method for recognizing license plate characters according to the embodiments of the present disclosure. It should be noted that an execution subject of the method for recognizing license plate characters according to the present embodiment is an apparatus for recognizing license plate characters, which is configured in an intelligent license plate recognition system, and the intelligent license plate recognition system is disposed in the electronic device. For example, the electronic device is a hardware device such as a terminal device and a server.

As shown in FIG. 1, the method for recognizing license plate characters includes:

In step 101, a vehicle image captured by an image capture device is acquired.

The image capture device is a camera.

In step 102, a license plate region of the vehicle image is located to acquire a license plate image.

In the present embodiment, in order to improve the ability of quickly locating the license plate image in the vehicle image, after acquiring the vehicle image, a YOLOV3 network is configured to locate the license plate region of the vehicle image to acquire the license plate image.

The YOLOV3 network is a deep learning image detection algorithm, which is mainly to perform two steps of target recognition and target location at the same time based on a regression idea, thereby improving the speed of target detection and meeting the requirements of real-time detection. The YOLOV3 network uses a convolutional network with 53 layers and uses a softmax layer.

In some embodiments of the present embodiment, the YOLOV3 network uses a fusion of three scale features for object detection and location, and use K-means clustering to generate nine prior boxes as an initial size of a bounding box (that is, a compact rectangular box containing the license plate), thereby achieving the effect of accelerating a convergence speed and improving a detection accuracy.

In the present embodiment, the Yolov3 network accurately locates license plates of vehicles of various colors in various complex environments, and the recognition time is about 20 ms.

In step 103, feature extraction is performed on the license plate image through a convolutional neural network to acquire feature information of the license plate image, wherein the convolutional neural network includes residual network structure.

In the present embodiment, convolutional layers in the convolutional neural network usually perform feature extraction on the license plate image to acquire a feature image corresponding to the license plate image. However, the feature extraction of the license plate image by the convolutional layer is prone to feature loss of the license plate image; and when a depth of the convolutional neural network increases, the problem of gradient vanishing occurs. In the present embodiment, in order to improve subsequent recognition accuracy of the license plate characters, the residual network structure is provided in the convolutional neural network, so that through the residual network structure, the gradient vanishing in the convolutional neural network caused by depth increase is effectively prevented, and the problem of the feature loss in a convolution process is reduced.

In some embodiments of the present disclosure, the above convolutional neural network also includes the convolutional layer and a pooling layer, except for the residual network structure. In the present embodiment, in order to avoid gradient vanishing and reduce feature loss in the convolution process, the convolutional neural network is connected in a sequence of the convolutional layer, the residual network structure, and the pooling layer. That is, the convolutional neural network provided by the embodiment of the present disclosure includes the convolutional layer, the residual network structure, and the pooling layer that are successively connected.

Specifically, after the license plate image is input into the convolutional neural network, the convolutional layer in the convolutional neural network perform feature extraction on the license plate image to obtain a first feature image of the license plate image. Correspondingly, the first feature image is input to the residual network structure, and the feature image output by the residual network structure is input to the pooling layer for corresponding processing.

In some embodiments of the present disclosure, in order to ensure the recognition efficiency and recognition accuracy, three convolutional layers is provided in the convolutional neural network to perform feature extraction on the license plate image.

In some embodiments of the present disclosure, in a case that the above convolutional neural network uses three convolutional layers, in order to avoid gradient vanishing and reduce feature loss in the convolution process, a first convolutional layer, the residual network structure, a second convolutional layer, a third convolutional layer, and the pooling layer are successively connected to form the convolutional neural network of the embodiments of the present disclosure, thereby reducing the feature loss in the convolution process to the greatest extent.

In the present embodiment, in order to further improve the license plate recognition accuracy, the first convolutional layer is set as a 1*1 convolutional layer, that is, P=1×1 in the first convolutional layer, wherein P is a padding parameter.

In some embodiments of the present disclosure, a Batch Normalization layer is added after the first convolutional layer in the convolutional neural network, which effectively improves the network performances and accelerates the convergence speed.

In some embodiments of the present disclosure, in order to effectively prevent the problem of gradient vanishing, the convolutional neural network in the present embodiment uses Leaky ReLU as an activation function.

In the present embodiment, in order to effectively reduce computational amount while also effectively preventing the gradient vanishing of the convolutional neural network and reducing the feature loss in the convolution process, the residual network structure in the present embodiment include a first residual network structure and a second residual network structure. Correspondingly, the convolutional neural network includes the first convolutional layer, the first residual network structure, the second residual network structure, the second convolutional layer, the third convolutional layer, and the pooling layer that are successively connected.

Figure 2:
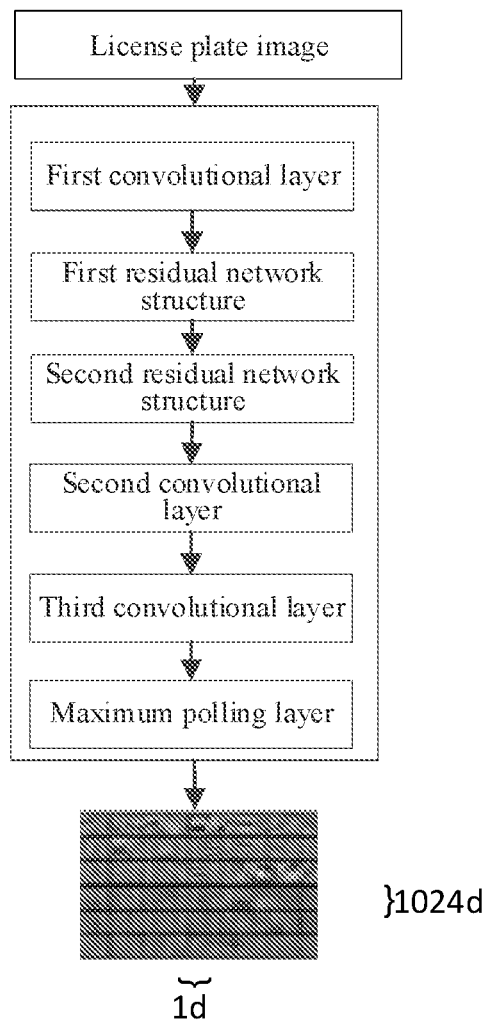
FIG. 2 is a schematic diagram of a network structure of a convolutional neural network including a first residual network structure and a second residual network structure according to some embodiments of the present disclosure.

FIG. 2 is a schematic diagram of a network structure of the convolutional neural network including the first residual network structure and the second residual network structure. As shown in FIG. 2, the network structure of the convolutional neural network is specifically: the first convolutional layer, the first residual network structure connected to the first convolutional layer, the second residual network structure connected to the first residual network structure, the second convolutional layer connected to the second residual network structure, the third convolutional layer connected to the second convolutional layer, and a max pooling layer connected to the third convolutional layer.

In some embodiments of the present disclosure, parameters of the convolutional neural network are as shown in Table 1, wherein Filters is the number of convolution kernels, K is the size of the convolution kernel, S is the step size, and P is the padding parameter.

TABLE 1

Parameters of convolutional neural network

| Types | Parameters |
|---|---|
| Input | Filters: 1, W: 220, H: 32 |
| Convolution1 | Filters: 64, K = 3, S = 1, P = 1 × 1 |
| Batch normalization | — |
| Leaky ReLU | — |
| Residual-1 | — |
| Leaky ReLU | — |
| Residual-2 | — |
| Batch normalization | — |
| Leaky ReLU | — |
| Convolution2 | Filters: 512, K = 1, S = 1, P = 0 × 0 |
| Leaky ReLU | — |
| Convolution3 | Filters: 1024, K = 3, S = 1, P = 1 × 1 |
| Leaky ReLU | — |
| Max pooling | K = 2, S = 2, P = 0*0 |

In Table 1, Residual-1 represents the first residual network structure, Residual-2 represents the second residual network structure, and ConvolutionN represents the $N^{th}$ convolutional layer, wherein N is any integer from 1 to 3.

In some embodiments of the present disclosure, in order to further effectively improve the network performances and accelerate the convergence speed, the Batch Normalization layer is provided between the second residual network structure and the Leaky ReLU in the convolutional neural network.

In some embodiments of the present disclosure, a network structure of the first residual network structure is the same as a network structure of the second residual network structure: the network structure includes a first network substructure, a second network substructure, and an adder; the first network substructure includes a max pooling layer, a first convolutional sub-layer, a second convolutional sub-layer, a third convolutional sub-layer and a fourth convolutional sub-layer that are successively connected; the second network substructure includes a fifth convolutional sub-network; an input end of the max pooling layer and an input of the fifth convolutional sub-network are connected to an output of an output layer of the first convolutional layer; and an output of the fourth convolutional sub-layer and an output of the fifth convolutional sub-network are connected to an input of the adder.

Figure 3:
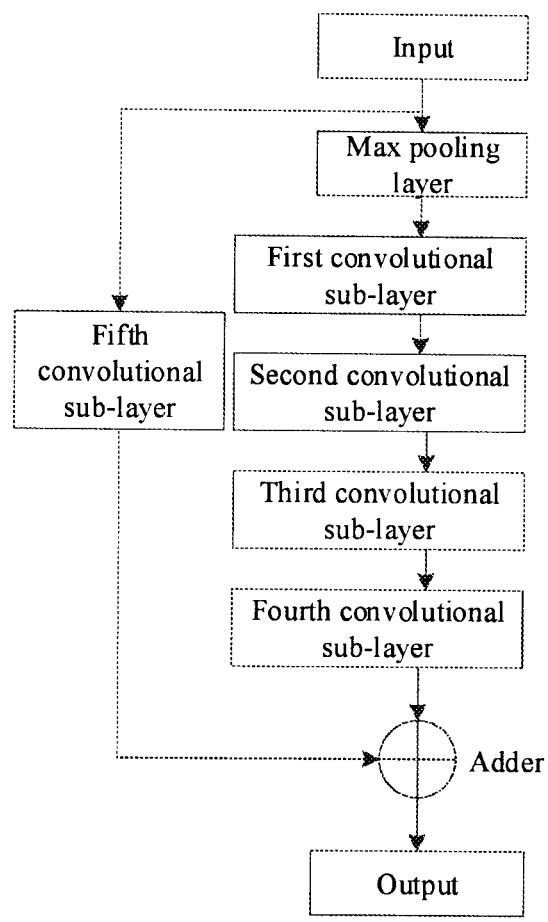
FIG. 3 is a schematic diagram of a network structure of the first residual network structure according to some embodiments of the present disclosure.

The schematic diagram of a network structure of the first residual network structure is as shown in FIG. 3.

In the present embodiment, after the first convolutional layer in the convolutional neural network outputs a feature image of the license plate image, the feature image is input into the first residual network structure, the output of the first residual network structure is input into the second residual network structure again, and then, the feature information output by the second residual network structure is input into a corresponding processing layer connected to the second residual network structure, so as to perform subsequent processing through the corresponding processing layer.

Although the network structures of the first residual network structure and the second residual network structure in the present embodiment are the same, network parameters used by the two are different.

In the present embodiment, the residual network structure is implemented in the form of skip connection, which effectively prevents the gradient vanishing of the convolutional neural network and reduces the feature loss in the convolution process, and alleviates the gradient dispersion problem to a certain extent. In addition, the residual network structure of the present embodiment also enables forward and backward information propagation to be more smoothly.

Specifically, the numbers of convolution kernels corresponding to the convolutional layers in the first residual network structure and the second residual network structure are different.

Detailed parameters corresponding to the first residual network structure in the present embodiment are as shown in Table 2, wherein Filters is the number of convolution kernels, K is the size of the convolution kernel, S is the step size, and P is the padding parameter.

TABLE 2

Detailed parameters of first residual network structure

| Types | Parameters |
|---|---|
| Max pooling | K = 2, S = 2, P = 0*0 |
| Convolution1 | Filters: 128, K = 3, S = 1, P = 1 × 1 |
| Leaky ReLU | — |
| Convolution2 | Filters: 64, K = 1, S = 1, P = 0 × 0 |
| Leaky ReLU | — |
| Convolution3 | Filters: 128, K = 3, S = 2 × 1, P = 1 × 1 |
| Leaky ReLU | — |
| Convolution4 | Filters: 256, K = 3, S = 1, P = 1 × 1 |
| Leaky ReLU | — |
| Convolution5 | Filters: 256, K = 3, S = 4 × 2, P = 1 × 1 |
| Leaky ReLU | — |
| Residual | — |
| Leaky ReLU | — |

Convolution in the table represents the convolutional layer, and ConvolutionN represents the $N^{th}$ convolutional sub-layer, wherein N is any integer from 1 to 5.

Detailed parameters of the second residual network structure are as shown in Table 3.

TABLE 3

Detailed parameters of second residual network structure

| Types | Parameters |
|---|---|
| Max pooling | K = 2, S = 2, P = 0 × 0 |
| Convolution1 | Filters: 512, K = 3, S = 1, P = 1 × 1 |
| Leaky ReLU | — |
| Convolution2 | Filters: 256, K = 1, S = 1, P = 0 × 0 |
| Leaky ReLU | — |

TABLE 3-continued

Detailed parameters of second residual network structure

| Types | Parameters |
| --- | --- |
| Convolution3 | Filters: 512, K = 3, S = 2 × 1, P = 1 × 1 |
| Leaky ReLU | — |
| Convolution4 | Filters: 1024, K = 3, S = 1, P = 1 × 1 |
| Leaky ReLU | — |
| Convolution5 | Filters: 1024, K = 3, S = 4 × 2, P = 1 × 1 |
| Leaky ReLU | — |
| Residual | — |
| Leaky ReLU | — |

In step 104, the feature information is analyzed through a bidirectional recurrent neural network model to acquire the license plate characters corresponding to the license plate image.

In the embodiment of the present disclosure, the above bidirectional recurrent neural network model includes a bidirectional recurrent neural network and a connectionist temporal classification (CTC) network.

In some embodiments of the present disclosure, in order to improve the recognition accuracy of the license plate characters, the bidirectional recurrent neural network of the present embodiment includes a first-layer bidirectional long and short-term memory (BLSTM) network and a second-layer bidirectional long and short-term memory network that are successively connected.

Each LSTM network in the bidirectional long and short-term memory network in the present embodiment contains 512 hidden units. Therefore, an output depth of each layer of BLSTM is 1024, and the output of the last layer of BLSTM is connected to two fully-connected layers, wherein a depth of the first fully-connected layer is 1024, and a depth of the second fully-connected layer is the number of categories of the license plate characters (for example, 66).

In some embodiments of the present disclosure, in order to prevent the occurrence of overfitting, a dropout layer is provided between the two fully-connected layers in the present embodiment. That is, the second-layer bidirectional long and short-term memory network of the present embodiment includes: the first fully-connected layer, the dropout layer connected to the first fully-connected layer, and the second fully-connected layer connected to the dropout layer.

Figure 4:
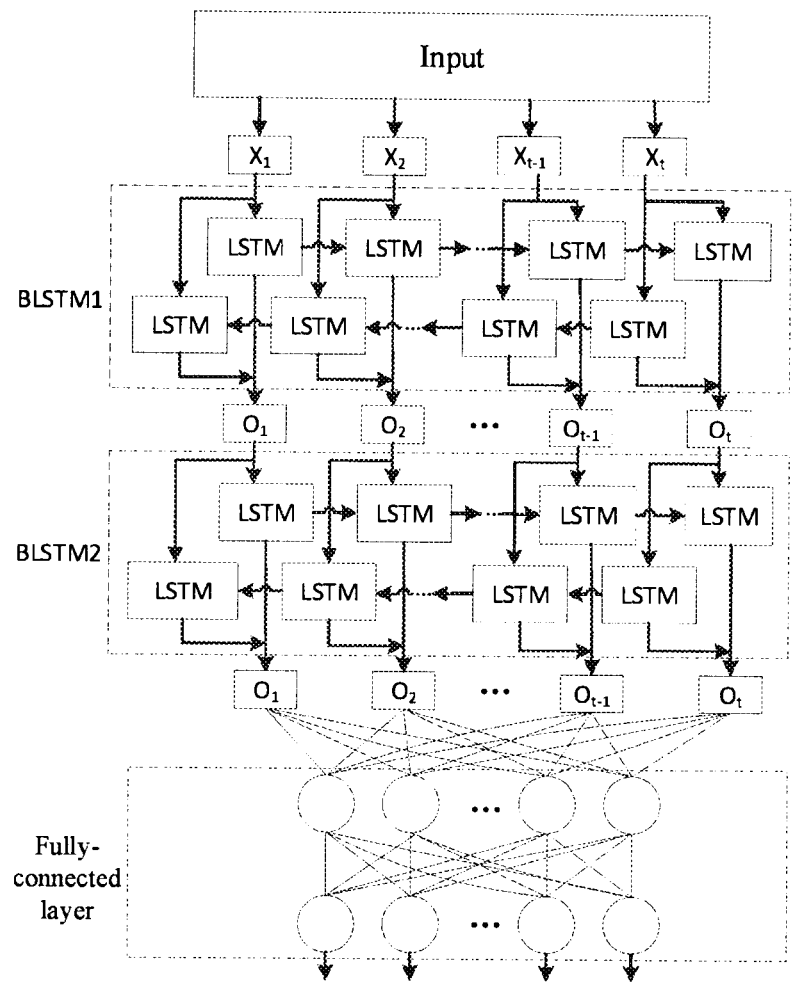
FIG. 4 is a schematic diagram of a network structure of a bidirectional recurrent neural network model according to some embodiments of the present disclosure.

The schematic diagram of a network structure of the bidirectional recurrent neural network model in the present embodiment is as shown in FIG. 4.

In the present embodiment, after the license plate image is acquired from the collected vehicle image, feature extraction is directly performed on the entire license plate image through the convolutional neural network, and the extracted feature information is analyzed through the bidirectional recurrent neural network model to acquire the license plate characters in the license plate image. Thus, it can be seen that since the present embodiment does not need to perform character segmentation on the license plate image, the time used for character segmentation in a license plate recognition process is reduced, and the speed of the license plate recognition is further improved.

According to the method for recognizing license plate characters provided by the embodiments of the present disclosure, after acquiring the vehicle image captured by an image capture device, a license plate image in the vehicle region is located to acquire the license plate image, and feature extraction of the license plate image is performed by the convolutional neural network including the residual network structure, which effectively avoids gradient vanishing and reduces feature loss in a convolution process of the convolutional neural network, so that the bidirectional recurrent neural network model accurately recognizes the license plate characters of the license plate image based on the feature information of the license plate image. Therefore, character segmentation for the license plate is not needed, and the license plate characters on the license plate is acquired by directly recognizing the entire license plate, thereby the characters of the license plate are prevented from being segmented and separately recognized, which improves the recognition speed and the recognition accuracy.

Figure 5:
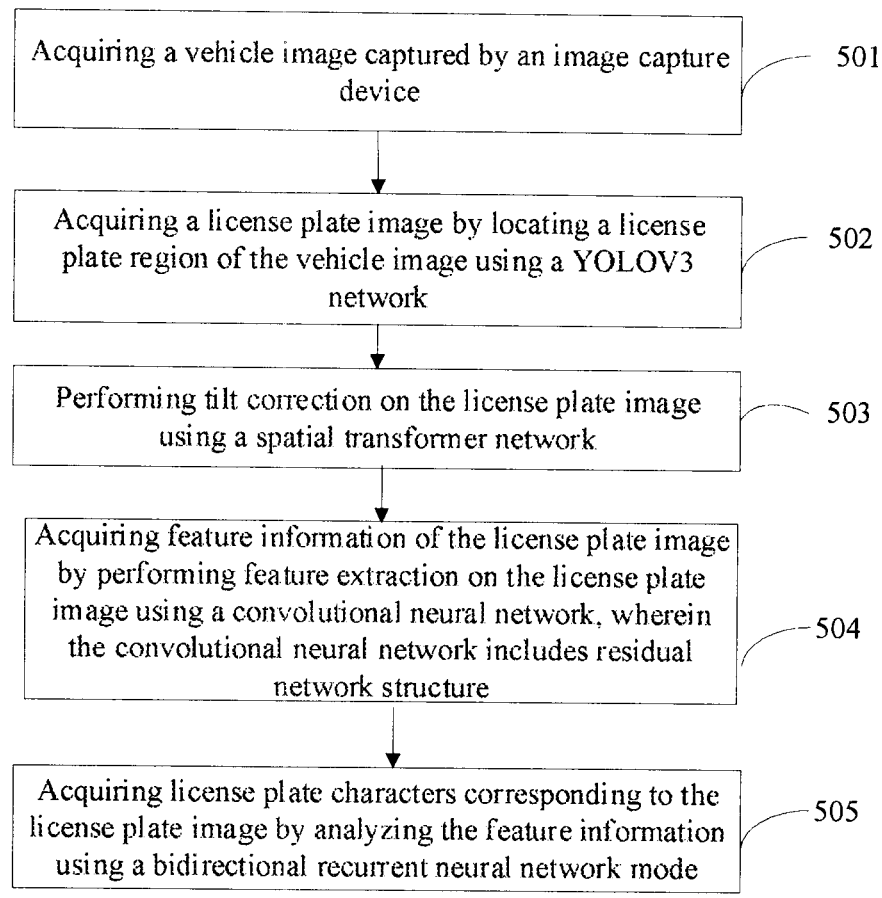
FIG. 5 is a schematic flowchart of another method for recognizing license plate characters according to some embodiments of the present disclosure.

FIG. 5 is a schematic flowchart of another method for recognizing license plate characters according to the embodiments of the present disclosure. It should be noted that these present embodiments are further refinement or optimization of the foregoing embodiments.

As shown in FIG. 5, the method for recognizing license plate characters includes:

In step 501, a vehicle image captured by an image capture device is acquired.

In step 502, a license plate area of the vehicle image is located by using a YOLOV3 network to acquire a license plate image.

In step 503, tilt correction is performed on the license plate image using a spatial transformer network.

In the present embodiment, the spatial transformer network (STN) includes a localisation network, a grid generator and a sampler.

Specifically, after acquiring the license plate image, the license plate image is input into the localisation network to acquire an affine transformation parameter for correcting the license plate image; the affine transformation parameter is input into the grid generator to acquire a corresponding affine transformation matrix: and perform affine transformation on each pixel coordinate of the license plate image based on the affine transformation matrix by the sampler to correct the license plate image.

The above localisation network is a network for regression of a transformation parameter θ, and specific parameters of the network are as shown in Table 4, wherein Filters is the number of convolution kernels, K is the size of the convolution kernel, S is the step size, and P is the padding parameters: the input of the localisation network is a grayscale image, and finally a spatial transformation parameter is output through a series of hidden network layers. The form of θ is various, and in a case that 2D affine transformation needs to be implemented, θ is the output of a 6-dimensional (2×3) vector. The size of θ depends on the type of transformation, in a case that the input is a 2D image, a 2D affine transformation needs to be implemented. Here, the network outputs a 2*3 matrix as shown in Formula 2-1, which is denoted as $A_\theta$.

$$A_\theta = \begin{bmatrix} \theta_{11} & \theta_{12} & \theta_{13} \\ \theta_{21} & \theta_{22} & \theta_{23} \end{bmatrix} \qquad 2\text{-}1$$

TABLE 4

Parameters of localisation network

| Types | Parameters |
| --- | --- |
| Input | GrayScaleImage, W: 220, H: 32 |
| Convolution1 | Filters: 8, K = 3, S = 1, P = 1 × 1 |
| Leaky ReLU | — |

TABLE 4-continued

Parameters of localisation network

| Types | Parameters |
| --- | --- |
| Max pooling1 | K = 2, S = 2, P = 0*0 |
| Convolution1 | Filters: 16, K = 3, S = 1, P = 1 × 1 |
| Leaky ReLU | — |
| Convolution1 | Filters: 32, K = 3, S = 1, P = 1 × 1 |
| Leaky ReLU | — |
| FC Layer | Filters: 64 |
| Leaky ReLU | — |
| Dropout | — |
| FC Layer | Filters: 6 |

The above grid generator constructs a sampling grid based on a predicted transformation parameter, and obtains the output by performing sampling transformation on points in a set of input images. The grid generator actually acquires a mapping relationship $T_\theta$. Assuming that coordinates of each pixel of the input image are $(x_i^s, y_i^s)$, the coordinates of each pixel output by the STN are $(x_i^t, y_i^t)$, and the spatial transformation function $T_\theta$ is a two-dimensional affine transformation function, thus the corresponding relationship between $(x_i^s, y_i^s)$ and $(x_i^t, y_i^t)$ is expressed as 2-2:

$$\begin{pmatrix} x_i^s \\ y_i^s \end{pmatrix} = T_\theta(G_i) = A_\theta \begin{pmatrix} x_i^t \\ y_i^t \\ 1 \end{pmatrix} = \begin{bmatrix} \theta_{11} & \theta_{12} & \theta_{13} \\ \theta_{21} & \theta_{22} & \theta_{23} \end{bmatrix} \begin{pmatrix} x_i^t \\ y_i^t \\ 1 \end{pmatrix} \quad 2\text{-}2$$

The sampler uses both the sampling grid and the input image as the input and acquires the transformed result of the input image.

The above sampler samples input image features on the basis of the mapping relationship acquired by the network generator to acquire the image features that achieve a correction effect by spatial transformation.

The sampling method used in the present embodiment is a bilinear interpolation method.

In the present embodiment, the license plate image is corrected through the STN while noise interference around the license plate image is also filtered through the localisation network, so that the license plate is easier to recognize.

In step 504, feature extraction is performed on the license plate image through a convolutional neural network to acquire feature information of the license plate image, wherein the convolutional neural network includes residual network structure.

In step 505, the feature information is analyzed through a bidirectional recurrent neural network model to acquire the license plate characters corresponding to the license plate image.

The license plate characters include Chinese characters, letters, and numbers.

According to the method for recognizing license plate characters provided by the embodiment of the present disclosure, after acquiring the vehicle image captured by an image capture device, the vehicle region in the license plate image is located to acquire the license plate image, the license plate image is subjected to tilt correction, and feature extraction of the corrected license plate image is performed by the convolutional neural network including the residual network structure, which effectively avoids gradient vanishing and reduces the feature loss in the convolution process of the convolutional neural network, so that the bidirectional recurrent neural network model accurately recognizes the license plate characters of the license plate image based on the feature information of the license plate image.

Based on the above description, it can be seen that in the present embodiment, after the license plate in the vehicle picture is directly located, there is no need to perform character segmentation on the license plate, and the license plate image acquired after the location is directly input into the convolutional neural network that includes the residual network structure for feature extraction, and the license plate characters are recognized by the bidirectional recurrent neural network model based on the feature information of the license plate image, thereby directly recognizing the entire license plate, and the license plate characters are prevented from being segmented and separately recognized, which improves the recognition speed.

In the present embodiment, experiments are carried out on the license plate recognition method with the STN and the license plate recognition method without the STN. According to experimental results, it is determined that an accuracy rate of license plate recognition without the STN network is 94.6%, which is lower than an accuracy rate of the license plate recognition model with the STN network that is 96.1%. An average loss of license plate recognition without the STN network is 0.53, which is higher than an average loss of the license plate recognition with the STN network that is 0.40. Thus, it can be seen that performing tilt correction on the license plate image before the license plate image is input to the convolutional neural network further improves the recognition accuracy of the license plate characters.

In order to show rationality of the number of layers of the BLSTM and the number of hidden units in the present disclosure, Table 5 shows that: in a case that the number of hidden units are 128, 256, 512, and 1024, the accuracy rate of license plate recognition and the average loss of license plate recognition of the network of the present disclosure without a STN with one-layer BLSTM, two-layer BLSTM and three-layer BLSTM. Since necessity of the STN network has been verified previously, in order to improve a training convergence speed, the STN network is not added during network verification, and the experimental parameters obtained by this way reflect the rationality of BLSTM parameters selected in the present disclosure. In the case of three-layer BLSTM, the convergence speed of the license plate recognition network is much slower than that of the two-layer BLSTM and one-layer BLSTM, which shows that the two-layer BLSTM and 512 hidden units that are selected by the network of the present disclosure are the most reasonable solution.

TABLE 5

Analysis of BLSTM

| | n-layer number | | | |
| --- | --- | --- | --- | --- |
| | 128 | 256 | 512 | 1024 |
| n-unit | | ACC/loss | | |
| One- BLSTM | 90.0/0.61 | 93.1/0.51 | 91.5/0.65 | 91.5/0.78 |
| Two -BLSTM | 89.2/0.78 | 90.7/0.68 | 94.6/0.53 | 91.5/0.67 |
| Three -BLSTM | 90.7/0.93 | 92.3/0.72 | 92.3/0.93 | 93.1/0.99 |

It should be noted that the number before the slash in the above table is the value of the accuracy rate ACC of license plate recognition, and the number after the slash represents the value of the average loss of license plate recognition. For example, 94.6/0.53 represents that the accuracy rate ACC of license plate recognition is 94.6%, and the average loss of license plate recognition is 0.53.

In addition, the present embodiment also analyzes the fully-connected layer (FC_layer).

In order to select the optimal number of fully-connected layers, Table 6 shows that: the accuracy rate of license plate recognition and the average loss of license plate recognition by the model in a case that the network of the present disclosure without STN with one-layer full connection, two-layer full connection, and three-layer full connection and the experimental parameters obtained by this way reflect the rationality of fully connected parameters selected by the network of the present disclosure. The ACC represents the accuracy rate of license plate recognition under the corresponding model, the Loss represents the average loss of license plate recognition under the corresponding model, F1 represents an output depth of first-layer full connection, F2 represents an output depth of second-layer full connection, and F3 represents an output depth of third-layer full connection. The results show that the model of the present disclosure has the optimal performance.

TABLE 6

Analysis of fully-connected layers

| N-FC | Data | |
|---|---|---|
| | ACC(%) | Loss(%) |
| One-FC (F1 = 66) | 93.1 | 0.49 |
| Two-FC (F1 = 1024, F2 = 66) | 94.6 | 0.53 |
| Three-FC (F1 = 1024, F2 = 1024, F3 = 66) | 91.5 | 0.97 |

Corresponding to the methods for recognizing license plate characters according to the above several embodiments, an apparatus for recognizing license plate characters is further provided by some embodiments of the present disclosure. Since the apparatus for recognizing license plate characters according to the embodiments of the present disclosure corresponds to the methods for recognizing license plate characters according to the above several embodiments, the implementations of the methods for recognizing license plate characters are also applicable to the apparatus for recognizing license plate characters provided the present embodiment of the present disclosure, and will not be described in detail in the present embodiment.

Figure 6:
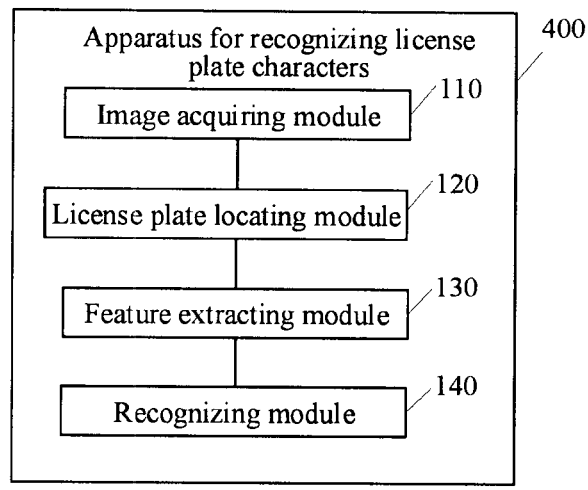
FIG. 6 is a schematic structural diagram of an apparatus for recognizing license plate characters according to some embodiments of the present disclosure.

FIG. 6 is a schematic structural diagram of an apparatus for recognizing license plate characters according to some embodiments of the present disclosure.

As shown in FIG. 6, the apparatus for recognizing license plate characters 400 includes an image acquiring module 110, a license plate locating module 120, a feature extracting module 130 and a recognizing module 140, wherein:

The image acquiring module 110 is configured to acquire a vehicle image captured by an image capture device.

The license plate locating module 120 is configured to acquire a license plate image by locating a license plate region of the vehicle image.

The feature extracting module 130 is configured to acquire feature information of the license plate image by performing feature extraction on the license plate image using a convolutional neural network, wherein the convolutional neural network includes residual network structure.

The recognizing module 140 is configured to acquire license plate characters corresponding to the license plate image by analyzing the feature information using a bidirectional recurrent neural network model.

In some embodiments of the present disclosure, the convolutional neural network includes convolutional layer, the residual network structure and a pooling layer successively connected.

In some embodiments of the present disclosure, the convolutional neural network includes a first convolutional layer, the residual network structure, a second convolutional layer, a third convolutional layer, and the pooling layer that are successively connected.

In some embodiments of the present disclosure, the convolutional layer include three layers, the residual network structure includes a first residual network structure and a second residual network structure, and the convolutional neural network includes the first convolutional layer, the first residual network structure, the second residual network structure, the second convolutional layer, the third convolutional layer and the pooling layer that are successively connected.

In some embodiments of the present disclosure, a network structure of the first residual network structure and a network structure of the second residual network structure are the same, the network structure includes a first network substructure, a second network substructure, and an adder; the first network substructure includes a max pooling layer, a first convolutional sub-layer, a second convolutional sub-layer, a third convolutional sub-layer and a fourth convolutional sub-layer that are successively connected; the second network substructure includes a fifth convolutional sub-network; an input of the max pooling layer and an input of the fifth convolutional sub-network are both connected to an output of an output layer of the first convolutional layer, and an output of the fourth convolutional sub-layer and an output of the fifth convolutional sub-network are both connected to an input of the adder.

Figure 7:
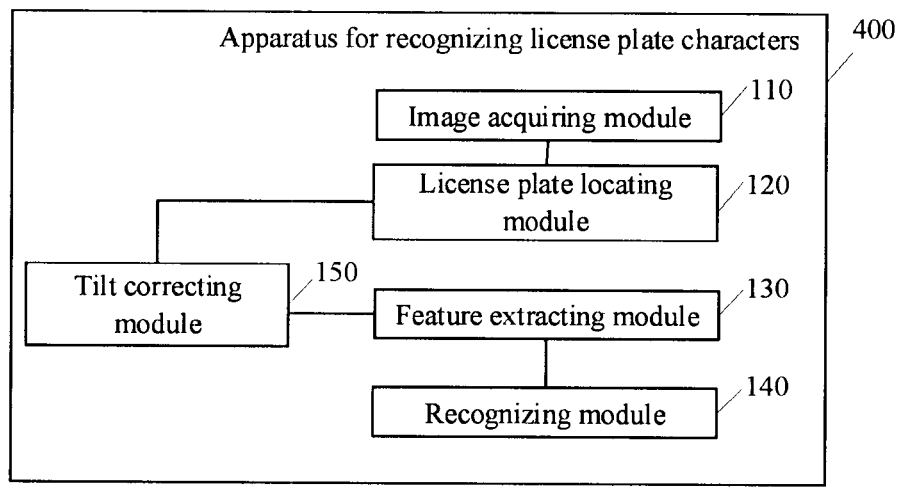
FIG. 7 is a schematic structural diagram of another apparatus for recognizing license plate characters according to some embodiments of the present disclosure.

In some embodiments of the present disclosure, on the basis of the embodiments shown in FIG. 6, the apparatus shown in FIG. 7 further includes:

a tilt correcting module 150 configured to perform tilt correction on the license plate image using a spatial transformer network.

In some embodiments of the present disclosure, the spatial transformer network includes a localisation network, a grid generator and a sampler, and the above tilt correcting module 150 is specifically configured to: input the license plate image into the localisation network to acquire an affine transformation parameter for correcting the license plate image; input the affine transformation parameter into the grid generator to acquire a corresponding affine transformation matrix; and perform affine transformation on each pixel coordinate of the license plate image based on the affine transformation matrix by the sampler to correct the license plate image.

In some embodiments of the present disclosure, the bidirectional recurrent neural network model includes a bidirectional recurrent neural network and a CTC network.

In some embodiments of the present disclosure, the bidirectional recurrent neural network includes a first-layer bidirectional long and short-term memory network and a second-layer bidirectional long and short-term memory network that are successively connected.

In an implementation of the present disclosure, the second-layer bidirectional long and short-term memory network includes: a first fully-connected layer, a dropout layer connected to the first fully-connected layer, and a second fully-connected layer connected to the dropout layer.

According to the apparatus for recognizing license plate characters provided by the embodiments of the present disclosure, after acquiring the vehicle image captured by an image capture device, a license plate image in the vehicle region is located to acquire the license plate image, and feature extraction of the license plate image is performed by the convolutional neural network including the residual network structure, which effectively avoids gradient vanishing and reduces feature loss in a convolution process of the convolutional neural network, so that the bidirectional recurrent neural network model accurately recognizes the license plate characters of the license plate image based on the feature information of the license plate image. Therefore, character segmentation for the license plate is not needed, and the license plate characters on the license plate is acquired by directly recognizing the entire license plate, thereby the characters of the license plate are prevented from being segmented and separately recognized, which improves the recognition speed and the recognition accuracy.

According to the embodiments of the present disclosure, the present disclosure further provides an electronic device and a non-transitory computer-readable storage medium.

Figure 8:
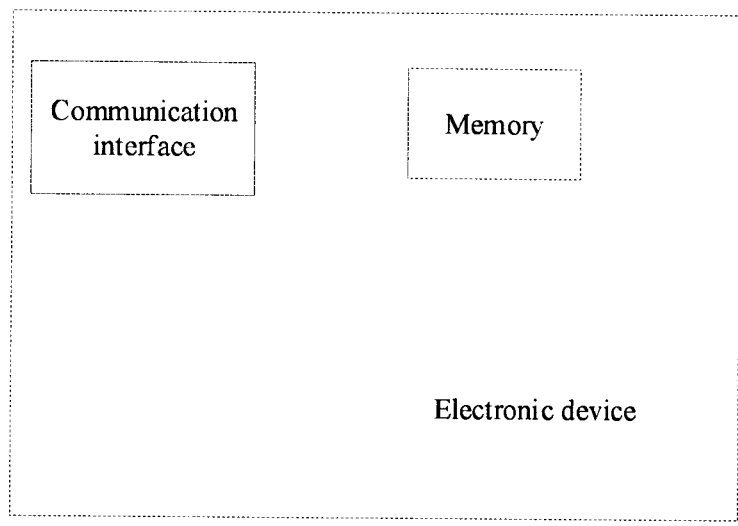
FIG. 8 is a block diagram of an electronic device for implementing the method for recognizing license plate characters of the embodiments of the present disclosure according to some embodiments of the present disclosure.

FIG. 8 shows a block diagram of an electronic device for implementing the method for recognizing license plate characters of the embodiments of the present disclosure according to some embodiments the present disclosure.

As shown in FIG. 8, the electronic device includes:

a memory 1001, a processor 1002, and one or more computer instructions stored in the memory 1001 and executable on the processor 1002.

The processor 1002, when loading and executing the one or more instructions, implements the database management method according to the above embodiments.

In addition, the electronic device further includes:

a communication interface 1003 configured for communication between the memory 1001 and the processor 1002.

The memory 1001 is configured to store the computer instructions executable on the processor 1002.

The memory 1001 includes a high-speed RAM memory, and also includes a non volatile memory, such as at least one disk memory.

The processor 1002, when executing instructions, implements the method for recognizing license plate characters according to the above embodiments.

If the memory 1001, the processor 1002 and the communication interface 1003 are independently implemented, the communication interface 1003, the memory 1001 and the processor 1002 are connected to each other through a bus and complete communication with each other. The bus is an industry standard architecture (ISA) bus, a peripheral component interconnection (PCI) bus, or an extended industry standard architecture (EISA) bus or the like. The bus is divided into an address bus, a data bus, a control bus and the like. For ease of representation, only one thick line is represented as bus in FIG. 8 for presentation, but it does not mean that there is only one bus or one type of bus.

Optionally, in terms of specific implementation, if the memory 1001, the processor 1002 and the communication interface 1003 are integrated on one chip to be implemented, the memory 1001, the processor 1002 and the communication interface 1003 communicates with each other through internal interfaces.

The processor 1002 is a central processing unit (CPU), or an application specific integrated circuit (ASIC), or is configured as one or more integrated circuits implementing the methods of the embodiments of the present disclosure.

In the description of the present disclosure, referring to the description of the terms such as "some embodiments", "some embodiments", "example", "specific example" or "some examples", which means that particular features, structures, materials or characteristics described in combination with the embodiment or example are included in at least some embodiments or example of the present disclosure. In the description of the present disclosure, schematic description of the above terms does not necessarily refer to the same embodiment or example. Furthermore, the described particular features, structures, materials or characteristics may be combined in any one or more embodiments or examples in a proper manner. In addition, various embodiments or examples described in the present description as well as features of various embodiments or examples, without contradicting each other, may be integrated and combined by those skilled in the art.

In addition, the terms "first" and "second" are used for descriptive purposes only, and are not to be construed as indicating or implying a relative importance or implicitly indicating the number of technical features indicated. Thus, a feature delimited with "first", "second" may expressly or implicitly include at least one of the features. In the description of the present disclosure, "a plurality of" means at least two, such as two and three, unless expressly and specifically defined otherwise.

Any process or method descriptions described in the flowcharts or otherwise herein may be understood as representing modules, segments or portions of codes that include one or more executable instructions for implementing the steps of a particular logical function or process. In addition, the scope of preferred embodiments of the present disclosure includes further implementations in which functions may be performed in a substantially simultaneous form or an inverse sequence based on the involved functions, rather than the sequence shown or discussed, which should be understood by those skilled in the art to which the embodiments of the present disclosure belongs.

The logic and/or steps represented in the flowcharts or otherwise described herein, for example, an ordered list of executable instructions to be considered for implementing the logical functions, may be embodied in any computer-readable medium for use by, or in conjunction with, instruction execution systems, apparatuses, or devices (such as computer-based systems, systems including processors, or other systems which fetches instructions from and execute instructions from the instruction execution systems, apparatuses, or devices). For the present disclosure, the "computer-readable medium" may be any medium that can contain, store, communicate, propagate, or transport the program for use by or in conjunction with the instruction execution systems, apparatuses, or devices. More specific examples (a non-exhaustive list) of the computer-readable medium include the following: an electrical connection with one or more wires (electronic apparatus), a portable computer diskette (a magnetic apparatus), a random access memory (RAM), a read-only memory (ROM), an erasable programmable read-only memory (EPROM or flash memory), an optical fiber apparatus, and a portable compact disc read-only memory (CDROM). In addition, the computer-readable medium may even be paper or other suitable mediums on which the program may be printed, as the program can be electrically captured, via, for instance optical scanning of the paper or other medium, then compiled, interpreted or otherwise processed in a suitable manner if necessary, and then stored in a computer memory.

It should be understood that various aspects of the present disclosure may be implemented by hardware, software, firmware, or a combination thereof. In the above embodiments, a plurality of steps or methods may be implemented with software or firmware that is stored in the memory and executed by a suitable instruction execution system. For example, if implemented with the hardware, as in another embodiment, implementation may be with any or a combination of the following technologies which are all well known in the art: a discrete logic circuit having a logic gates for implementing logic functions upon data signals, an application-specific integrated circuit with having appropriate combinational logic gate circuit, a programmable gate array (PGA), a field programmable gate array (FPGA), and the like.

Those skilled in the art can understand that all or part of the steps of the method carried by the above embodiments may be completed by the program to instruct related hardware, the program may be stored in one computer-readable storage medium, and the program, when executed, includes one or a combination of the steps of the method embodiments.

In addition, the various functional units in the various embodiments of the present disclosure may be integrated into one processing module, or each unit may exist physically and separately, or two or more units may be integrated into one module. The above integrated modules may be implemented in the form of hardware or in the form of software functional modules. The integrated modules, if implemented in the form of the software functional modules and sold or used as an independent product, may also be stored in one computer-readable storage medium.

The storage medium mentioned above may be a read-only memory, a disk or an optical disk or the like. Although the embodiments of the present disclosure have been shown and described above, it is understandable that the above embodiments are exemplary and should not be construed as limitations to the present disclosure. Those ordinary skilled in the art can make alterations, modifications, substitutions and variations to the above embodiments in a scope of the present disclosure.

What is claimed is:

1. A method for recognizing license plate characters, comprising:
   acquiring a vehicle image captured by an image capture device;
   acquiring a license plate image by locating a license plate region of the vehicle image, wherein an object is detected and located by using a fusion of three scale features, and nine prior boxes are generated as an initial size of a compact rectangular box containing the license plate by using K-means clustering;
   acquiring feature information of the license plate image by performing feature extraction on the license plate image using a convolutional neural network, wherein the convolutional neural network comprises a residual network structure; and
   acquiring license plate characters corresponding to the license plate image by analyzing the feature information using a bidirectional recurrent neural network model.

2. The method according to claim 1, wherein prior to acquiring the feature information of the license plate image by performing the feature extraction on the license plate image using the convolutional neural network, the method further comprises:
   performing tilt correction on the license plate image using a spatial transformer network.

3. The method according to claim 1, wherein the bidirectional recurrent neural network model comprises a bidirectional recurrent neural network and a connectionist temporal classification (CTC) network.

4. The method according to claim 3, wherein the bidirectional recurrent neural network comprises a first-layer bidirectional long and short-term memory network and a second-layer bidirectional long and short-term memory network that are successively connected.

5. The method according to claim 1, wherein the convolutional neural network comprises a convolutional layer, the residual network structure, and a pooling layer that are successively connected.

6. The method according to claim 5, wherein the convolutional layer comprises three layers, the residual network structure comprises a first residual network structure and a second residual network structure, and the convolutional neural network comprises a first convolutional layer, the first residual network structure, the second residual network structure, a second convolutional layer, a third convolutional layer, and the pooling layer that are successively connected.

7. The method according to claim 6, wherein a network structure of the first residual network structure is the same as a network structure of the second residual network structure, and the network structure comprises a first network substructure, a second network substructure, and an adder; wherein
   the first network substructure comprises a max pooling layer, a first convolutional sub-layer, a second convolutional sub-layer, a third convolutional sub-layer, and a fourth convolutional sub-layer that are successively connected;
   the second network substructure comprises a fifth convolutional sub-network;
   an input of the max pooling layer and an input of the fifth convolutional sub-network are both connected to an output of an output layer of the first convolutional layer; and
   an output of the fourth convolutional sub-layer and an output of the fifth convolutional sub-network are both connected to an input of the adder.

8. An electronic device, comprising: one or more processors and a memory configured to store one or more computer instructions executable by the one or more processors, wherein the one or more processors, when loading and executing the one or more instructions, are caused to perform:
   acquiring a vehicle image captured by an image capture device;
   acquiring a license plate image by locating a license plate region of the vehicle image, wherein an object is detected and located by using a fusion of three scale features, and nine prior boxes are generated as an initial size of a compact rectangular box containing the license plate by using K-means clustering;
   acquiring feature information of the license plate image by performing feature extraction on the license plate image using a convolutional neural network, wherein the convolutional neural network comprises a residual network structure; and
   acquiring license plate characters corresponding to the license plate image by analyzing the feature information using a bidirectional recurrent neural network model.

9. The electronic device according to claim 8, wherein the one or more processors, when loading and executing the one or more instructions, are caused to perform:
performing tilt correction on the license plate image using a spatial transformer network.

10. The electronic device according to claim 8, wherein the bidirectional recurrent neural network model comprises a bidirectional recurrent neural network and a connectionist temporal classification (CTC) network.

11. The electronic device according to claim 10, wherein the bidirectional recurrent neural network comprises a first-layer bidirectional long and short-term memory network and a second-layer bidirectional long and short-term memory network that are successively connected.

12. The electronic device according to claim 8, wherein the convolutional neural network comprises a convolutional layer, the residual network structure, and a pooling layer that are successively connected.

13. The electronic device according to claim 12, wherein the convolutional layer comprises three layers, the residual network structure comprises a first residual network structure and a second residual network structure, and the convolutional neural network comprises a first convolutional layer, the first residual network structure, the second residual network structure, a second convolutional layer, a third convolutional layer, and the pooling layer that are successively connected.

14. The electronic device according to claim 13, wherein a network structure of the first residual network structure is the same as a network structure of the second residual network structure, and the network structure comprises a first network substructure, a second network substructure, and an adder; wherein
the first network substructure comprises a max pooling layer, a first convolutional sub-layer, a second convolutional sub-layer, a third convolutional sub-layer, and a fourth convolutional sub-layer that are successively connected;
the second network substructure comprises a fifth convolutional sub-network;
an input of the max pooling layer and an input of the fifth convolutional sub-network are both connected to an output of an output layer of the first convolutional layer; and
an output of the fourth convolutional sub-layer and an output of the fifth convolutional sub-network are both connected to an input of the adder.

15. A non-transitory computer-readable storage medium storing one or more computer instructions thereon, wherein the one or more computer instructions, when loaded and executed by a computer, cause the computer to perform:
acquiring a vehicle image captured by an image capture device;
acquiring a license plate image by locating a license plate region of the vehicle image, wherein an object is detected and located by using a fusion of three scale features, and nine prior boxes are generated as an initial size of a compact rectangular box containing the license plate by using K-means clustering;
acquiring feature information of the license plate image by performing feature extraction on the license plate image using a convolutional neural network, wherein the convolutional neural network comprises a residual network structure; and
acquiring license plate characters corresponding to the license plate image by analyzing the feature information using a bidirectional recurrent neural network model.

16. The non-transitory storage medium according to claim 15, wherein the one or more computer instructions, when loaded and executed by a computer, cause the computer to perform:
performing tilt correction on the license plate image using a spatial transformer network.

17. The non-transitory storage medium according to claim 15, wherein the bidirectional recurrent neural network model comprises a bidirectional recurrent neural network and a connectionist temporal classification (CTC) network.

18. The non-transitory storage medium according to claim 15, wherein the convolutional neural network comprises a convolutional layer, the residual network structure, and a pooling layer that are successively connected.

19. The non-transitory storage medium according to claim 18, wherein the convolutional layer comprise three layers, the residual network structure comprises a first residual network structure and a second residual network structure, and the convolutional neural network comprises a first convolutional layer, the first residual network structure, the second residual network structure, a second convolutional layer, a third convolutional layer, and the pooling layer that are successively connected.

20. The non-transitory storage medium according to claim 19, wherein a network structure of the first residual network structure is the same as a network structure of the second residual network structure, and the network structure comprises a first network substructure, a second network substructure, and an adder; wherein
the first network substructure comprises a max pooling layer, a first convolutional sub-layer, a second convolutional sub-layer, a third convolutional sub-layer, and a fourth convolutional sub-layer that are successively connected;
the second network substructure comprises a fifth convolutional sub-network;
an input of the max pooling layer and an input of the fifth convolutional sub-network are both connected to an output of an output layer of the first convolutional layer; and
an output of the fourth convolutional sub-layer and an output of the fifth convolutional sub-network are both connected to an input of the adder.

* * * * *